US006760667B1

(12) United States Patent
Kelly et al.

(10) Patent No.: US 6,760,667 B1
(45) Date of Patent: Jul. 6, 2004

(54) METHOD FOR GENERATING P-S AND S-S SEISMIC DATA AND ATTRIBUTES FROM P-P SEISMIC DATA

(75) Inventors: Michael C. Kelly, Lake County, MT (US); Charles M. Skidmore, Tulsa, OK (US)

(73) Assignee: Emerald Geoscience Research Corporation, Tulsa, OK (US)

( * ) Notice: Subject to any disclaimer, the term of this patent is extended or adjusted under 35 U.S.C. 154(b) by 0 days.

(21) Appl. No.: 10/132,335

(22) Filed: Apr. 25, 2002

Related U.S. Application Data

(60) Provisional application No. 60/322,260, filed on Sep. 14, 2001.

(51) Int. Cl.[7] .................................................. G01V 1/28
(52) U.S. Cl. ........................................... 702/14; 702/18
(58) Field of Search ..................................... 702/14, 18

(56) References Cited

U.S. PATENT DOCUMENTS

| | | | |
|---|---|---|---|
| 5,999,486 A | 12/1999 | DeVault | |
| 6,058,074 A | 5/2000 | Swan et al. | |
| 6,091,669 A | 7/2000 | Chen | |
| 6,243,650 B1 * | 6/2001 | Skidmore et al. | ............. 702/17 |
| 6,263,284 B1 * | 7/2001 | Crider et al. | ................. 702/14 |
| 6,421,611 B1 | 7/2002 | Kelly et al. | |
| 6,529,833 B2 * | 3/2003 | Fanini et al. | .................. 702/7 |
| 2002/0013661 A1 | 1/2002 | Van Riel et al. | |
| 2003/0018435 A1 | 1/2003 | Jenner et al. | |

OTHER PUBLICATIONS

Xiang–Yang Li, Hengchang Dai, Michael C. Mueller and Olav I. Barkved in "Compensating for the effects of gas clouds on C–wave imaging: A case study from Valhall" published in *The Leading Edge*, Sep. 2001, pp. 1022–1028.
Folke Engelmark, in "Using converted shear waves to image reservoirs with low–impedance contrast" published *The Leading Edge*, Jun. 2000, pp. 600–603.

* cited by examiner

*Primary Examiner*—Marc S. Hoff
*Assistant Examiner*—Anthony Gutierrez
(74) *Attorney, Agent, or Firm*—John W. Montgomery

(57) ABSTRACT

A method for generating P-S or S—S seismic data from P—P AVO data in P—P travel time for a geographic area includes obtaining a plurality of amplitude and angle of incidence pairs of P—P AVO data. The plurality of amplitude and angle of incidence pairs of P—P AVO data are inverted. Lastly, estimates of the rock property contrasts are produced from the inverted plurality of amplitude and angle of incidence pairs of P—P AVO data, the rock property contrasts including at least one of $\Delta Vp/Vp$, $\Delta Vs/Vs$ and $\Delta\rho/\rho$.

14 Claims, 14 Drawing Sheets

(8 of 14 Drawing Sheet(s) Filed in Color)

FIG. 11A

P-S and S-S data from P-P data

Generate a P-S or S-S dataset in P-P travel time by first obtaining P-P AVO amplitudes and angles of incidence which are then inverted to produce estimates of the rock property contrasts $\Delta Vp/Vp$, $\Delta Vs/Vs$ and $\Delta\rho/\rho$ in P-P travel time

- Generate P-S and/or S-S AVO attributes
- Generate P-S and/or S-S seismic data in P-P and/or P-S and/or S-S travel time and/or depth
- Invert P-P data using linear and/or non-linear AVO equations Generate P-S data using the above derived estimates of rock property contrasts $\Delta Vs/Vs$ and $\Delta\rho/\rho$:

$$Amp(\theta)_{PS} = D0 * \frac{Sin(\theta)*(2*Sin(\theta)^2 - g^2)}{2*g*\sqrt{g^2 - Sin(\theta)^2} - \frac{Sin(\theta)*Cos(\theta)}{g}} + D1 * \left( \frac{2*Sin(\theta)^3}{g*\sqrt{g^2 - Sin(\theta)^2}} - \frac{2*Sin(\theta)*Cos(\theta)}{g} \right)$$

Generate horizontal component of S-S data using the above derived rock property contrasts $\Delta Vp/Vp$, $\Delta Vs/Vs$ and $\Delta\rho/\rho$ and equation:

$$Amp(\theta)_{SSh} = h1 + h2 * Tan(\theta)^2$$

Generate vertical component of S-S data using the above derived rock property contrasts $\Delta Vp/Vp$, $\Delta Vs/Vs$ and $\Delta\rho/\rho$ and equation:

$$Amp(\theta)_{SSv} = v1 + v2 * Tan(\theta)^2 + v3 * Sin(\theta)^2 * Tan(\theta)^2$$

*FIG. 11C*

Generate a P-S or S-S dataset in P-P travel time by first obtaining P-P AVO amplitudes and angles of incidence which are then inverted using linear or non-linear AVO equations to produce estimates of the rock property contrasts $\Delta Vp/Vp$, $\Delta Vs/Vs$ and $\Delta \rho/\rho$ resulting in either P-P and/or P-S and/or S-S travel time or depth. Combinations of the rock properties can be constructed such as $\Delta Zs/Zs$, $\Delta (Vp/Vs)/(Vp/Vs)$ and $\Delta \sigma/\sigma$.

Generate P-S data using the above derived rock property contrasts $\Delta Vs/Vs$ and $\Delta \rho/p$:

$$Amp(\theta)_{PS} = D0 * \frac{Sin(\theta)*(2*Sin(\theta)^2 - g^2)}{2*g*\sqrt{g^2 - Sin(\theta)^2} - \frac{Sin(\theta)*Cos(\theta)}{g}} + D1 * \left( \frac{2*Sin(\theta)^3}{g*\sqrt{g^2 - Sin(\theta)^2}} - \frac{2*Sin(\theta)*Cos(\theta)}{g} \right)$$

Generate horizontal component of S-S data using the above derived rock property contrasts $\Delta Vp/Vp$, $\Delta Vs/Vs$ and $\Delta \rho/\rho$ and equation:

$$Amp(\theta)_{SSh} = h1 + h2 * Tan(\theta)^2$$

Generate vertical component of S-S data using the above derived rock property contrasts $\Delta Vp/Vp$, $\Delta Vs/Vs$ and $\Delta \rho/\rho$ and equation:

$$Amp(\theta)_{SSv} = v1 + v2 * Tan(\theta)^2 + v3 * Sin(\theta)^2 * Tan(\theta)^2$$

METHOD FOR GENERATING P-S AND S-S SEISMIC DATA AND ATTRIBUTES FROM P-P SEISMIC DATA

CROSS-REFERENCE TO RELATED APPLICATIONS

This application claims the benefits of the earlier filed provisional application Ser. No. 60/322,260 filed Sep. 14, 2001.

BACKGROUND OF THE INVENTION

This invention relates generally to processing seismic trace data, and more specifically to methods for processing P—P seismic trace data so as to generate P-S or S—S seismic data or attributes in P—P, P-S or S—S travel times or depth.

Existing methods for processing P—P data result in P—P amplitudes in P—P travel time. In addition, P—P data has proved to be limited in addressing certain exploration/exploitation problems.

SUMMARY OF THE INVENTION

According to one embodiment of the present disclosure, a method for generating P-S and/or S—S seismic data from P—P AVO (amplitude variation with offset) data is disclosed. The method generates P-S and/or S—S seismic data from P—P AVO data in at least one of P—P, P-S, or S—S travel times. Using multiple seismic data types to analyze a hydrocarbon prospect has advantages over using P—P data alone. It is noted that the acquisition and processing of traditional P-S or S—S data is more expensive, time consuming and complicated than acquiring and processing P—P data alone. However, according to one embodiment of the present disclosure, by generating P-S or S—S data from P—P data, it is possible to determine if a hydrocarbon prospect is highlighted using a particular type of data (i.e., P-S or S—S) without the expense and time required to acquire and process the traditional P-S or S—S data. Furthermore, the P-S and or S—S data generated from the P—P AVO data allows a robust method of aligning P—P data with at least one of P-S or S—S data.

A technical advantage of the embodiments of the present disclosure is the leveraging of a combination of P—P and P-S and/or S—S data necessary to address and solve certain exploration/exploitation problems.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 11A, 11B, 11C and 11D provide a schematic flow diagrams for a process according to an embodiment the present invention.

DETAILED DESCRIPTION OF THE INVENTION

P—P data alone, when processed to produce desired seismic attributes (such as stack amplitude, AVO intercept, slope, or other attributes), have proven inadequate to address many exploration problems. To address the inadequacies, efforts have been made to employ multiple data types, such as P-S and S—S data derived from land or marine multi-component acquisition. Once acquired, the multi-component data can be processed to P—P, P-S, and/or S—S data. However, the cost of acquiring and processing multi-component data is substantially above that of acquiring and processing P—P data.

The reflection amplitudes found in the data types of P—P, P-S, and/or S—S data are driven by dramatically different rock property combinations and by different equations, to be discussed further herein below with respect to Equations 1, 2, 3 and 4. In addition, the reflection amplitudes among different data types have a completely different character including different amplitudes and polarity, as illustrated by FIGS. 1 and 2.

Figure 1:
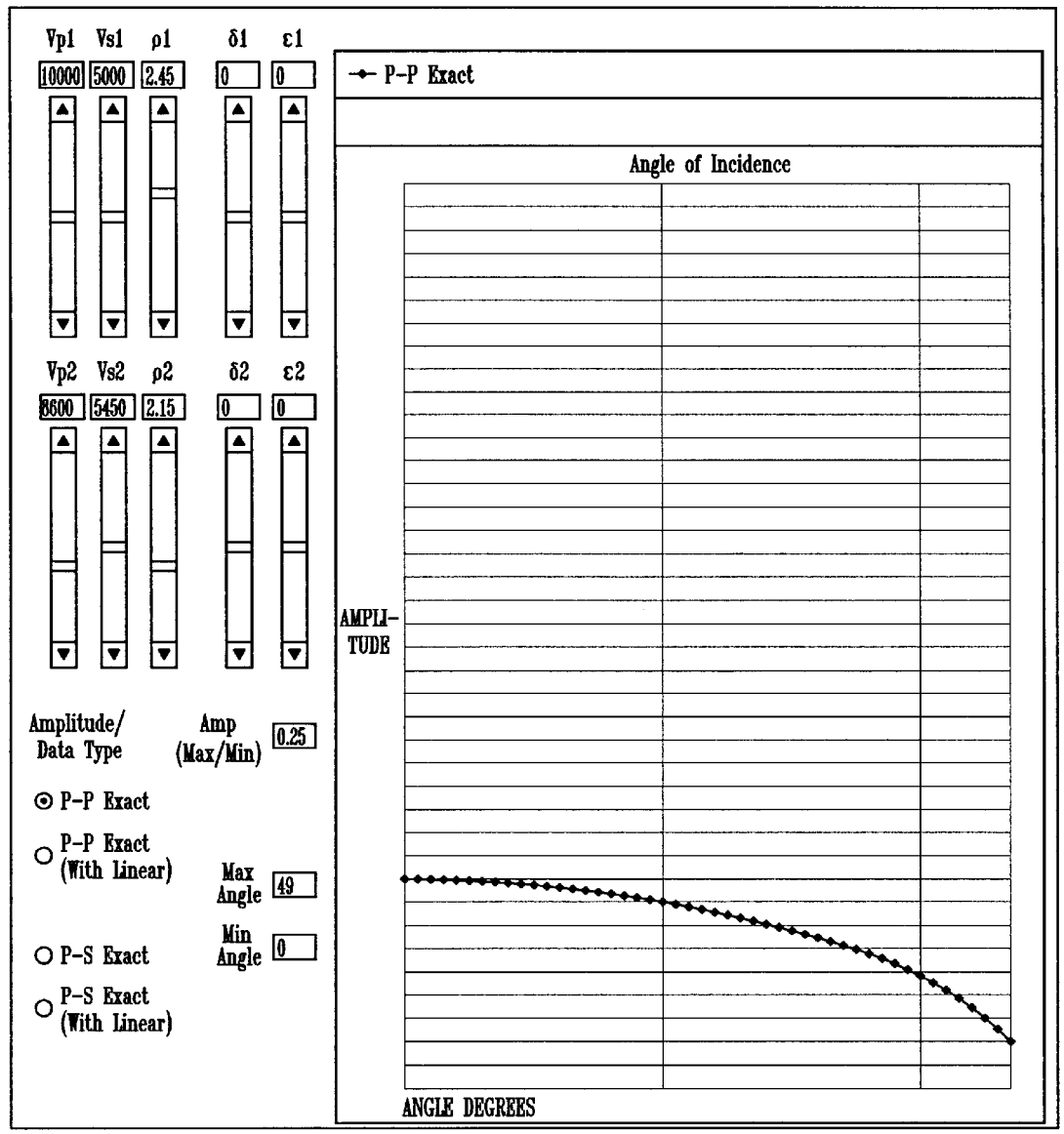
FIG. 1 illustrates a P—P amplitude response for a low impedance pay sand with an average cap rock.
Figure 2:
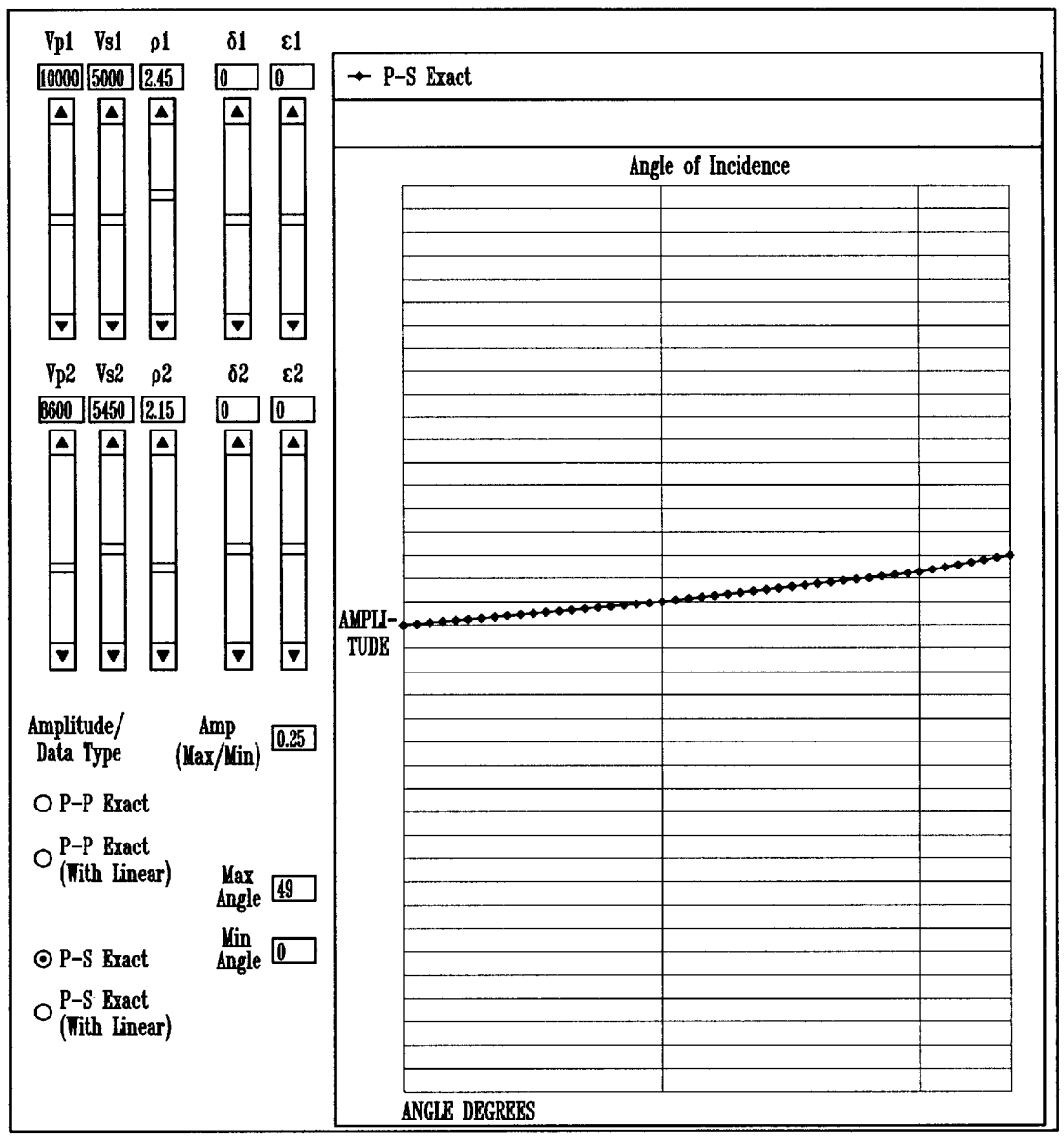
FIG. 2 illustrates a P-S AVO response for a low impedance pay sand with an average cap rock, using the same rock properties as shown in FIG. 1.

With reference now to FIGS. 1 and 2, FIG. 1 illustrates a P—P AVO response for a low impedance pay sand with an average cap rock. FIG. 2 illustrates a P-S amplitude response for the low impedance pay sand with an average cap rock. Note that the P—P AVO response of FIG. 1 is dramatically different compared with the P-S response illustrated in FIG. 2 when using the same rock properties. Accordingly, this illustrates how different the subsurface imaging will be using P—P vs. P-S or S—S data. In addition, this illustrates the difficulties of trying to tie or align one type of data with another when their vertical scales (i.e., time scales) are dramatically different, as discussed further below.

Accordingly, the subsurface image produced by P-S and S—S data will be dramatically different in timing, amplitude and character from P—P data. The fact that each data type is sensitive to different aspects of the subsurface properties makes multiple data types very useful. In other words, it is not that P-S or S—S data separately are necessarily superior to P—P data in any given instance (although in a given situation one could be better than the other), but rather that it is the combination of the P—P and P-S or S—S data that is most usually superior as an exploration/exploitation tool.

The solution begins with first determining what types of advantages the P-S or S—S data might offer as far as one or more of the following:

Highlighting pay-filled reservoirs;

Discriminating against partially and fully saturated reservoirs;

Highlighting portions of reservoirs that have bypassed pay;

Discriminating between good and poor quality reservoirs; and

Highlighting reservoirs which are weakly reflecting P—P reservoirs.

Additionally, for multiple data types to be considered together, the multiple data types must be aligned in either their common depth or data type dependant travel times. Data type dependant travel times include, for example, Tpp, Tps or Tss. However, since the amplitudes, character, and even polarity of the many data types are different, the alignment of the many data types is a complicated, time consuming and inaccurate process.

According to one embodiment of the present disclosure, the method includes generating the multiple data types using the rock property contrasts derived from P—P data. As a result, the method allows for robust alignment of responses of the various data types. By aligning the multiple data type reflection events, the reflecting horizon as imaged by each data type can be analyzed together, for example, using industry standard analysis algorithms or work stations.

In further detail, beginning with true amp processed prestack P—P data, the method includes performing a 3-parameter AVO inversion on the P—P data to produce estimates of the rock property contrasts $\Delta Vp/Vp$, $\Delta Vs/Vs$ and $\Delta \rho/\rho$. Performing the AVO inversion can be accomplished via use of linear or nonlinear equations, such as Equation 1 or Equation 2, discussed further herein below. In addition, the inversions can be constrained or unconstrained. Once inverted, the estimated rock property contrasts can be used to:

1) Calculate the P-S data or S—S data using any appropriate AVO equations, whether linear versions such as in Equations 3, 4a and 4b or non-linear versions, to calculate the full stack response, angle stack response, and AVO response; and 2) Calculate the rock property response directly from the rock property contrast, via Equations 5 and 6, to produce quantities such as $\Delta Zs/Zs$, $\Delta(Vp/Vs)/(Vp/Vs)$, $\Delta\sigma/\sigma$ and others.

With respect to the above, the quantities $\Delta Zs/Zs$, $\Delta(Vp/Vs)/(Vp/Vs)$, $\Delta\sigma/\sigma$ and others, are preferably laid down in P—P travel time, but depth or other travel times could also be used.

Once derived, the quantities $\Delta Zs/Zs$, $\Delta(Vp/Vs)/(Vp/Vs)$, $\Delta\sigma/\sigma$ and others, can be used to illustrate the response of the different data types to the rock properties in the subsurface. By doing this, one can determine which data type is best at highlighting a particular area or areas of the subsurface.

In the case where the cap rock and the reservoir are each isotropic and the data type is P—P, the equation which describes the amplitude variation with offset and hence angle of incidence ($\theta$), due to a reflection between the cap rock and reservoir, is given to linear order in the rock property contrasts by:

$$\mathrm{Amp}(\theta) = A + B^*\mathrm{Sin}(\theta)^2 + C^*\mathrm{Sin}(\theta)^2{}^*\mathrm{Tan}(\theta)^2 \qquad \text{Equation 1}$$

Where:

$A = (\frac{1}{2})^*\Delta Vp/Vp + (\frac{1}{2})^*\Delta\rho/\rho$, $B = (\frac{1}{2})^*\Delta Vp/Vp - (2/g^2)^*(2^*\Delta Vs/Vs + \Delta\rho/\rho)$, and $C = (\frac{1}{2})^*\Delta Vp/Vp$.

It will be noted that g=(Vp average)/(Vs average), is a ratio of the average Vp at a given location divided by the average Vs at such location. This is a ratio that is generally available for any given location under investigation. The same definition applies to other equations set forth below.

In the case where the cap rock and the reservoir are each isotropic and the data type is P—P, the equation which describes the amplitude variation with offset and hence angle of incidence ($\theta$), due to a reflection between the cap rock and reservoir, is given to second order in the rock property contrasts by:

$\mathrm{Amp}(\theta) = D00 + D11^*\mathrm{Sin}(\theta)^2$ $+ D12^*\mathrm{Tan}(\theta)^2{}^*\mathrm{Sin}(\theta)^2$ $+ D20^*\mathrm{Tan}(\theta)^4$ $+ D21^*\mathrm{Sin}(\theta)^2{}^*\mathrm{Cos}(\theta)^*f$ $+ D22^*\mathrm{Sin}(\theta)^2/(\mathrm{Cos}(\theta)^*f)$ $+ D23^*\mathrm{Sin}(\theta)^4/(\mathrm{Cos}(\theta)^*f)$ $+ D24^*\mathrm{Sin}(\theta)^6/(\mathrm{Cos}(\theta)^*f)$ $\qquad$ Equation 2

Where:

$D00 = (\frac{1}{2})^*\Delta Vp/Vp + (\frac{1}{2})^*\Delta\rho/\rho - (\Delta Vp/Vp)^2/4 - )-(\Delta\rho/\rho)^2/4$, $D11 = (\frac{1}{2})^*\Delta Vp/Vp - (2/g^2)^*(2^*\Delta Vs/Vs + \Delta\rho/\rho)$, $D12 = (\frac{1}{2})^*\Delta Vp/Vp + (\frac{1}{4})^*(\Delta Vp/Vp)^2$, $D20 = (\frac{1}{2})^*(\Delta Vp/Vp)^2$, $D21 = 4^*(\Delta Vs/Vs)^2 + 4^*\Delta Vs/Vs^*\Delta\rho/\rho - (\Delta\rho/\rho)^2/4$, $D22 = (\frac{1}{4})^*(\Delta\rho/\rho)^2$, $D23 = 2^*\Delta Vs/Vs^*\Delta\rho/\rho + (\Delta\rho/\rho)^2/4$, $D24 = 4^*(\Delta Vs/Vs)^2 + 4^*\Delta Vs/Vs^*\Delta\rho/\rho + (\Delta\rho/\rho)^2$, and $f = (g^2 - \mathrm{Sin}(\theta)^2)^{1/2}$.

In the case where the cap rock and the reservoir are each isotropic and the data type is P-S, the equation which describes the amplitude variation with offset and hence angle of incidence ($\theta$), due to a reflection between the cap rock and reservoir, is:

$$\mathrm{Amp}(\theta)_{PS} = D0 * \frac{\mathrm{Sin}(\theta)*(2*\mathrm{Sin}(\theta)^2 - g^2)}{2*g*\sqrt{g^2 - \mathrm{Sin}(\theta)^2}} - \frac{\mathrm{Sin}(\theta)*\mathrm{Cos}(\theta)}{g} + D1 * \left( \frac{2*\mathrm{Sin}(\theta)^3}{g*\sqrt{g^2 - \mathrm{Sin}(\theta)^2}} - \frac{2*\mathrm{Sin}(\theta)*\mathrm{Cos}(\theta)}{g} \right) \qquad \text{Equation 3}$$

Where:

$D0 = (\frac{1}{2})^*\Delta\rho/\rho$, and $D0 = (2/g)^*\Delta Vs/Vs$.

In the case where the cap rock and the reservoir are each isotropic, and the data type is S—S, and the horizontal component is considered, the equation which describes the amplitude variation with offset and hence angle of incidence ($\theta$), due to a reflection between the cap rock and reservoir:

$$\mathrm{Amp}(\theta)_{SSh} = h1 + h2^*\mathrm{Tan}(\theta)^2 \qquad \text{Equation 4a}$$

Where:

$h1 = -(\frac{1}{2})^*\Delta Vs/Vs - (\frac{1}{2})^*\Delta\rho/\rho$, and $h2 = (\frac{1}{2})^*\Delta Vs/Vs$.

In the case where the cap rock and the reservoir are each isotropic, and the data type is S—S, and the vertical component is considered, the equation which describes the amplitude variation with offset and hence angle of incidence ($\theta$), due to a reflection between the cap rock and reservoir, is:

$$Amp(\theta)_{SS_V} = v1 + v2 * Tan(\theta)^2 + v3 * Sin(\theta)^2 * Tan(\theta)^2 \quad \text{Equation } 4b$$

Where:

$$v1 = -(\tfrac{1}{2}) * \Delta Vs/Vs - (\tfrac{1}{2}) * \Delta\rho/\rho,$$

$$v2 = (\tfrac{7}{2}) * \Delta Vs/Vs + (2) * \Delta\rho/\rho, \text{ and}$$

$$v3 = -(2)(2\Delta Vs/Vs + \Delta\rho/\rho).$$

The rock property contrast combinations which can be derived from P-S and S—S data include:

$$\Delta Zs/Zs = \Delta Vs/Vs + \Delta\rho/\rho \quad \text{Equation } 5$$

$$\Delta(Vp/Vs)/(Vp/Vs) = \Delta Vp/Vp - \Delta Vs/Vs \quad \text{Equation } 6$$

Figure 3:
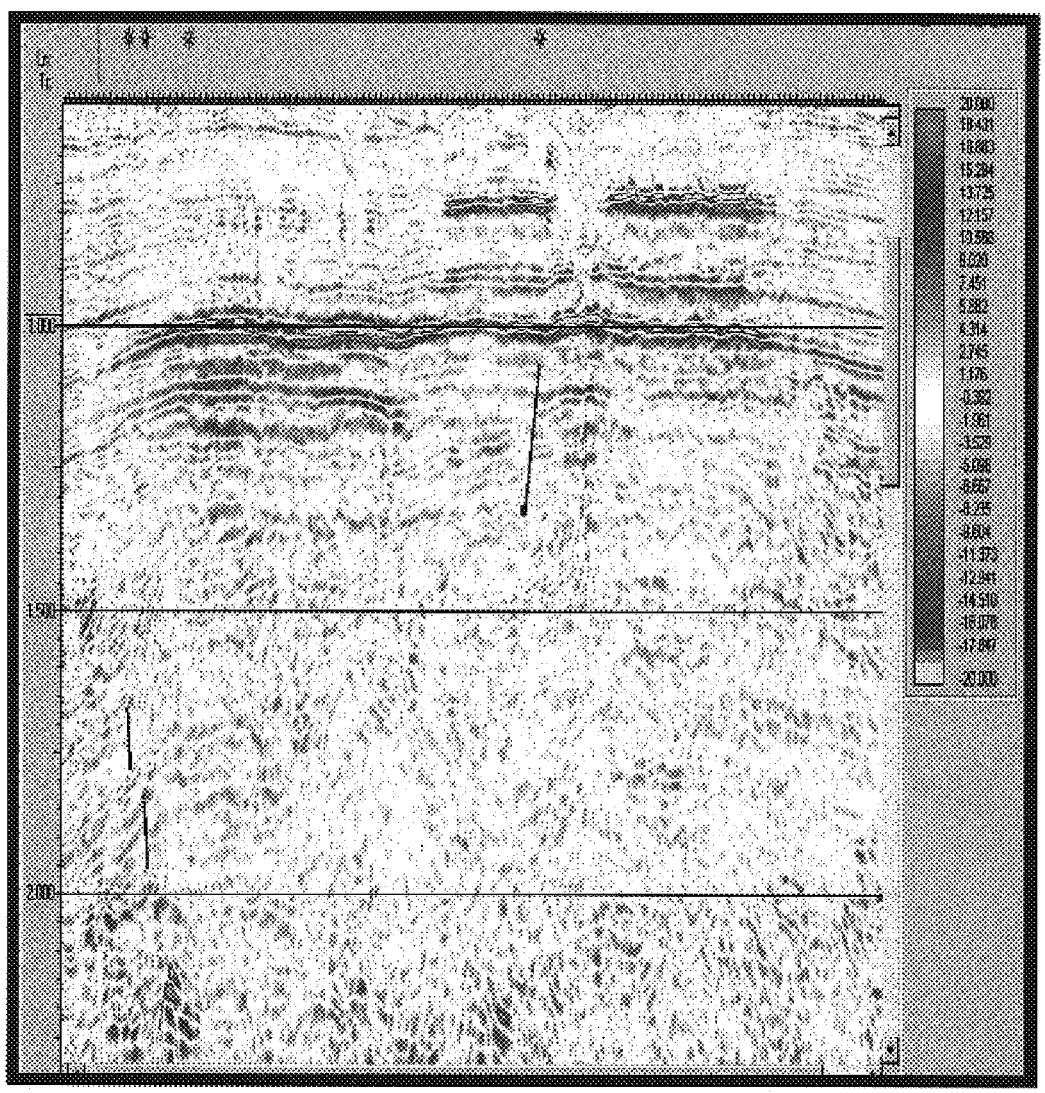
FIG. 3 shows a traditional P—P seismic section in P—P travel time.

FIG. 3 shows a traditional P—P seismic section in P—P travel time. More particularly, FIG. 3 shows a P—P amplitude section for an area of the Gulf of Mexico. Note the absence of strong reflectors in the zone from 1 to 2 seconds.

Figure 4:
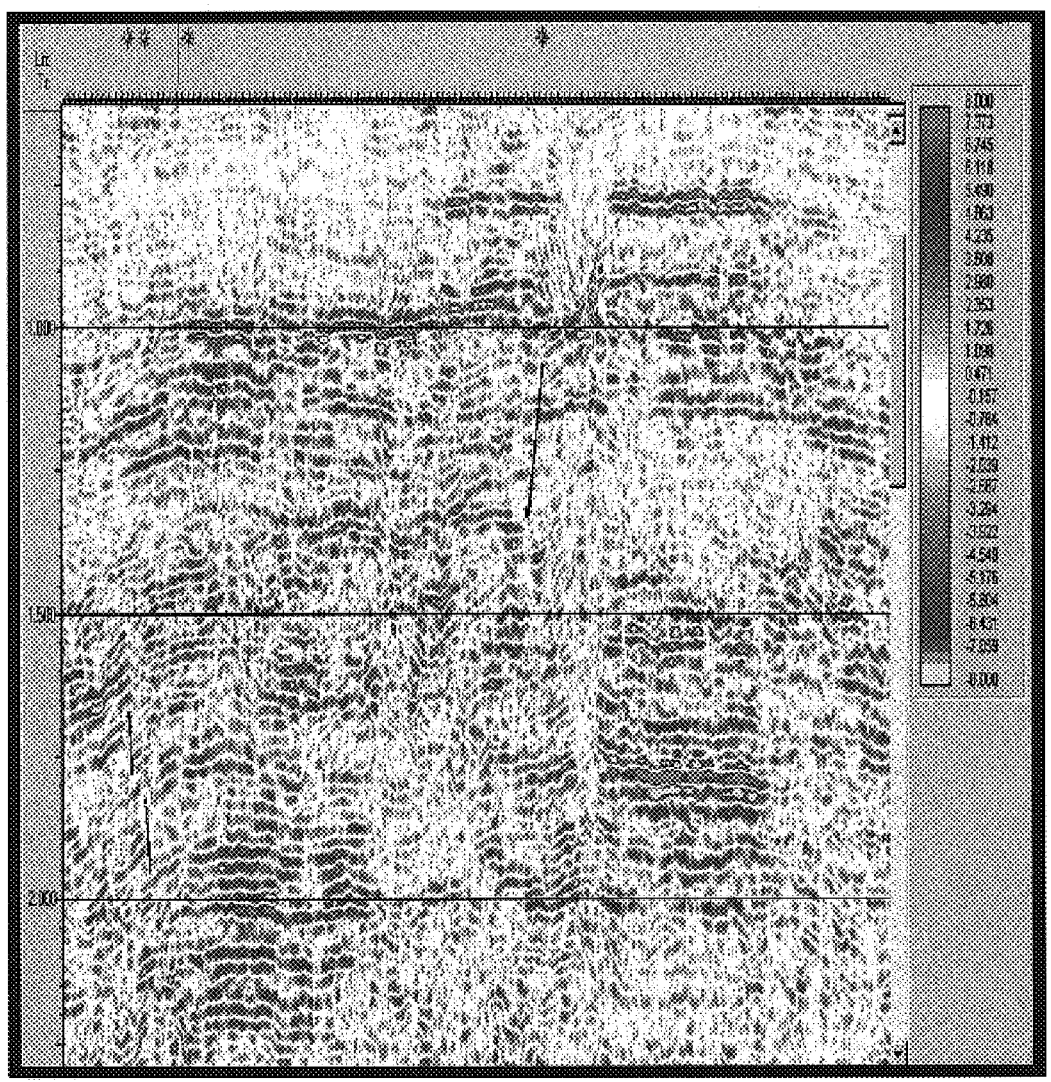
FIG. 4 shows a P-S Zs contrast section calculated from a P—P AVO inversion according to one embodiment of the present disclosure.

FIG. 4 shows a P-S Zs contrast section calculated from a P—P AVO inversion according to one embodiment of the present disclosure. More particularly, FIG. 4 shows the Zs contrast section for the area of the Gulf of Mexico, corresponding to the same area as that of FIG. 3. Note the strong reflectors in the zone from 1 to 2 seconds. Compare this with the traditional P—P section shown in FIG. 3. This clearly shows that if P-S data were acquired in this area and processed to produce a Zs contrast section according to the embodiments of the present disclosure, then it would produce better results than a traditional P—P data set as shown in FIG. 3.

It should also be noted that the data set of FIG. 4 can be used as a guide to align P-S data, which had been acquired in this area and processed to produce a Zs contrast section, using the P—P data that is shown in FIG. 3. By aligning the two types of data, the results can be used together to produce a superior analysis versus using only one data type.

It will be further understood that S—S data generated form P—P data, according to the method described herein, could also be used to robustly align S—S data that might be actually acquired in a given area. By thus uniquely aligning the P—P data with the S—S, the results can be used together to produce a superior analysis versus using only one data type. Further, advantages may be obtained where all three data types of acquired data are conveniently aligned according to this aspect of the invention using estimates for P-S and S—S data generated from the P—P data. It might also be noted that upon understanding the foregoing, an estimate of P—P data could be generated from acquired S—S data with a slightly more complex manipulation of the above equations, or similar known equations. While this is currently not as practical as the specific method described above, because P—P data is currently significantly less expensive to obtain than S—S data and because P—P data is almost always acquired and available whenever S—S data is acquired, it could become more practical with time and future developments and could thus provide some of the benefits as describe herein. Alignment of the acquired P—P data or acquired P-S data using estimates generated using acquired S—S data could then also provide some of the advantages as described herein.

Figure 5:
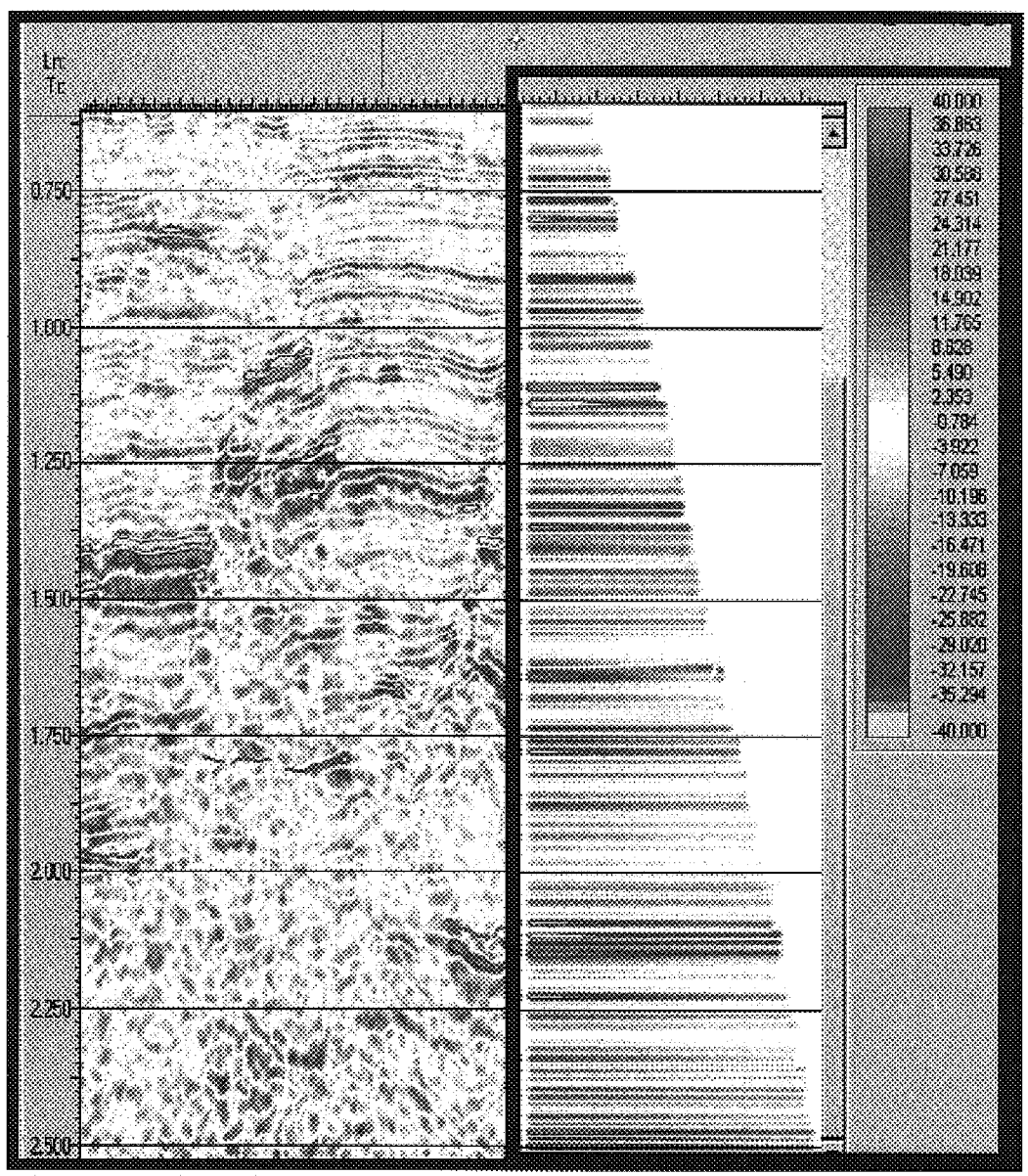
FIG. 5 shows a P—P seismic amplitude section and a P—P synthetic in P—P travel time.
Figure 6:
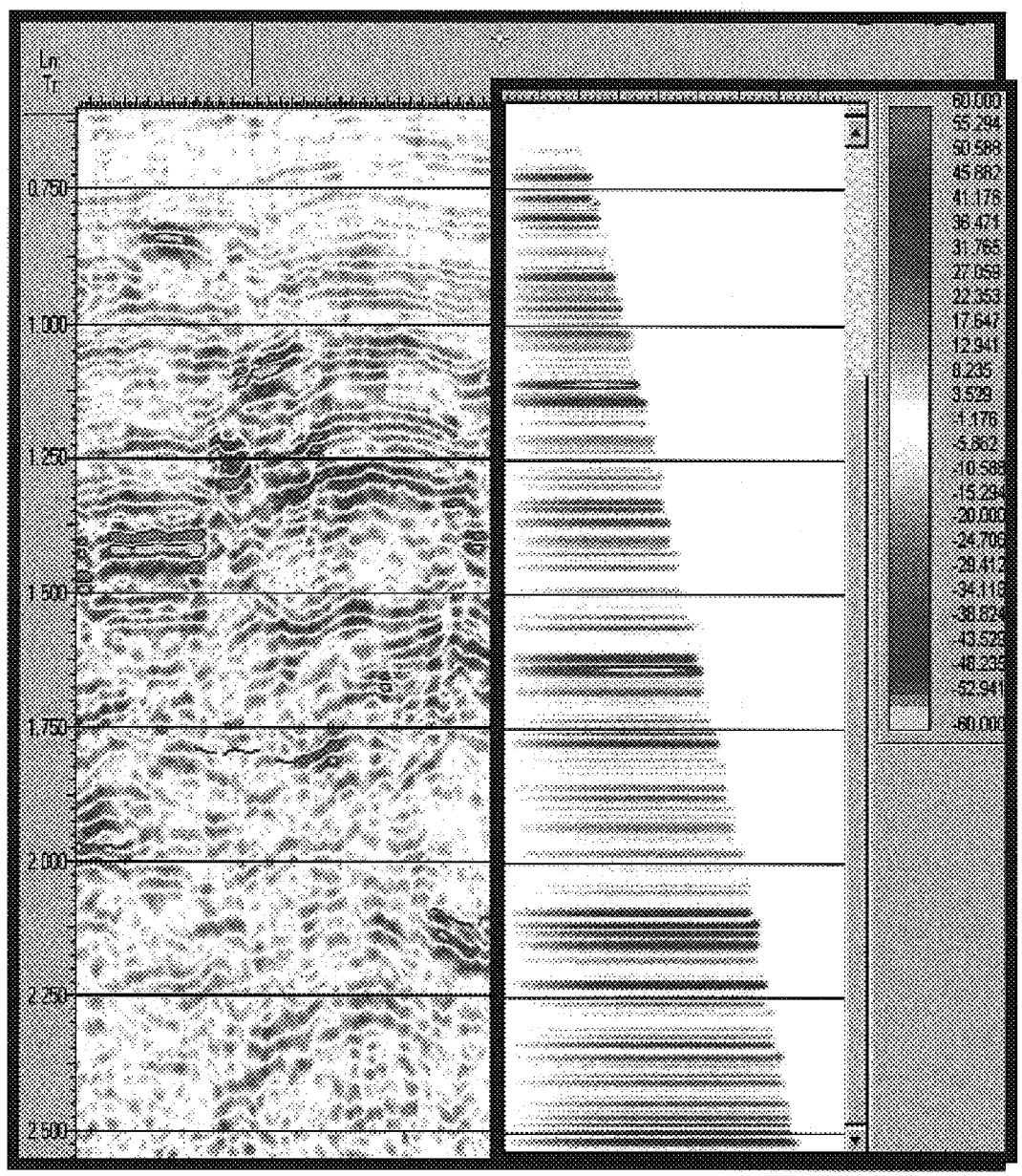
FIG. 6 shows a P-S Zs contrast section calculated from a P—P AVO inversion according to another embodiment of the present disclosure and a P-S synthetic in P—P travel time.

FIG. 5 shows a P—P seismic amplitude section and a P—P synthetic in P—P travel time. FIG. 6 shows a P-S Zs contrast section calculated from a P—P AVO inversion according to another embodiment of the present disclosure and a P-S synthetic in P—P travel time. Note the dramatically different reflectivity found on the P—P data and synthetic in FIG. 5 versus the P-S data and synthetic found in FIG. 6.

Figure 7:
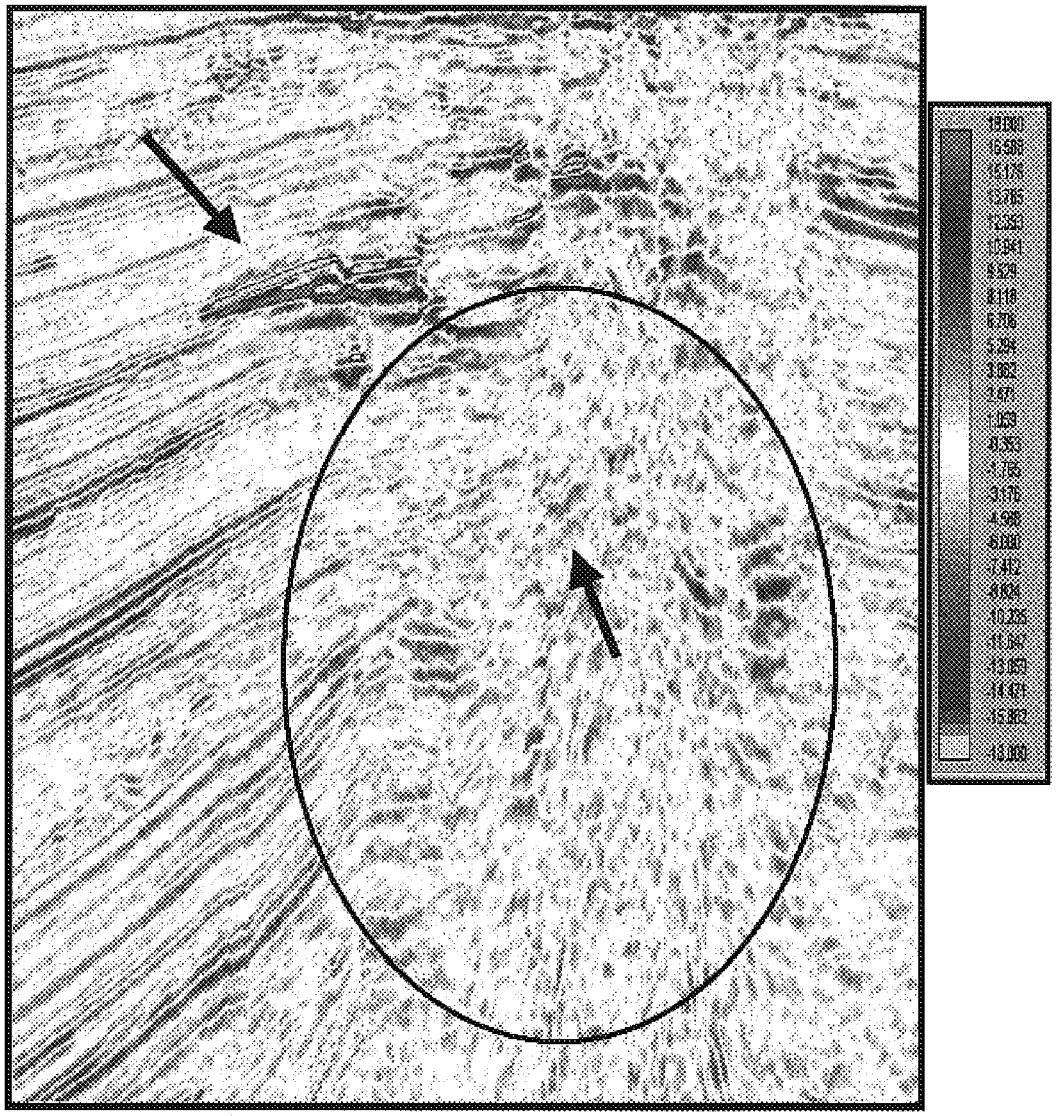
FIG. 7 shows a P—P amplitude section.
Figure 8:
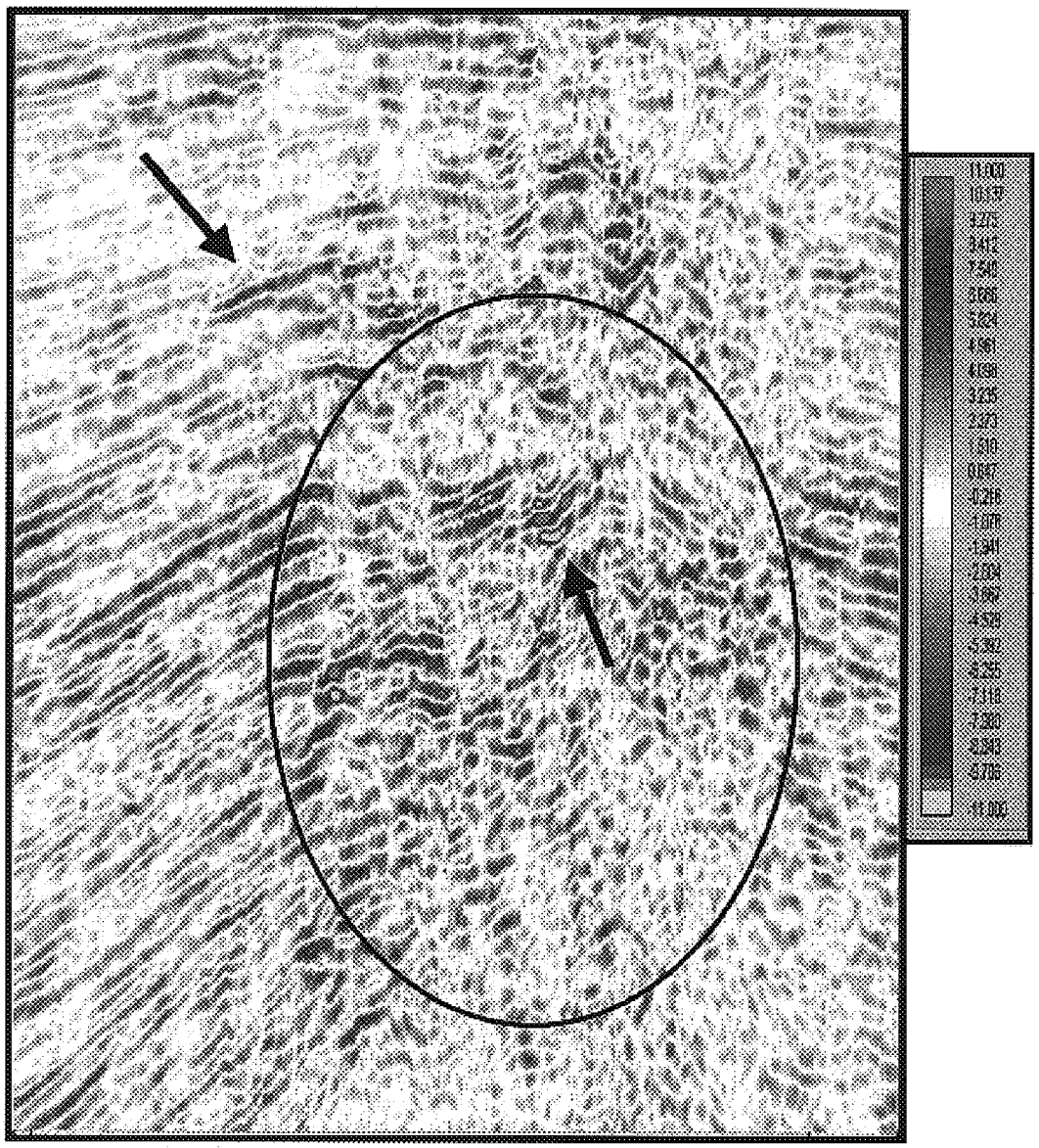
FIG. 8 shows a P-S Zs contrast section calculated from P—P AVO inversion according to another embodiment of the present disclosure.

FIG. 7 shows a P—P amplitude section for an area of the Gulf of Mexico. Note the absence of strong reflectors in the zone indicated by the circle in FIG. 7. FIG. 8 shows a P-S Zs contrast section calculated from P—P AVO inversion according to another embodiment of the present disclosure. More particularly, FIG. 8 shows the P-S Zs contrast section for the same area of the Gulf of Mexico of FIG. 7. Note the strong reflectors in the zone indicated by the circle in FIG. 8. Compare this with the traditional P—P amplitude section of FIG. 7. This clearly shows that if P-S data were acquired in this area and processed to produce a Zs contrast section it would produce better results than a traditional P—P data set as shown in FIG. 7. It should also be noted that the above data set of FIG. 8 can be used as a guide to align P-S data which had been acquired in this area and processed to produce a Zs contrast section with the P—P data that is shown in FIG. 7. By aligning the two types of data, the results can be used together to produce a superior analysis versus using only one data type.

Figure 9:
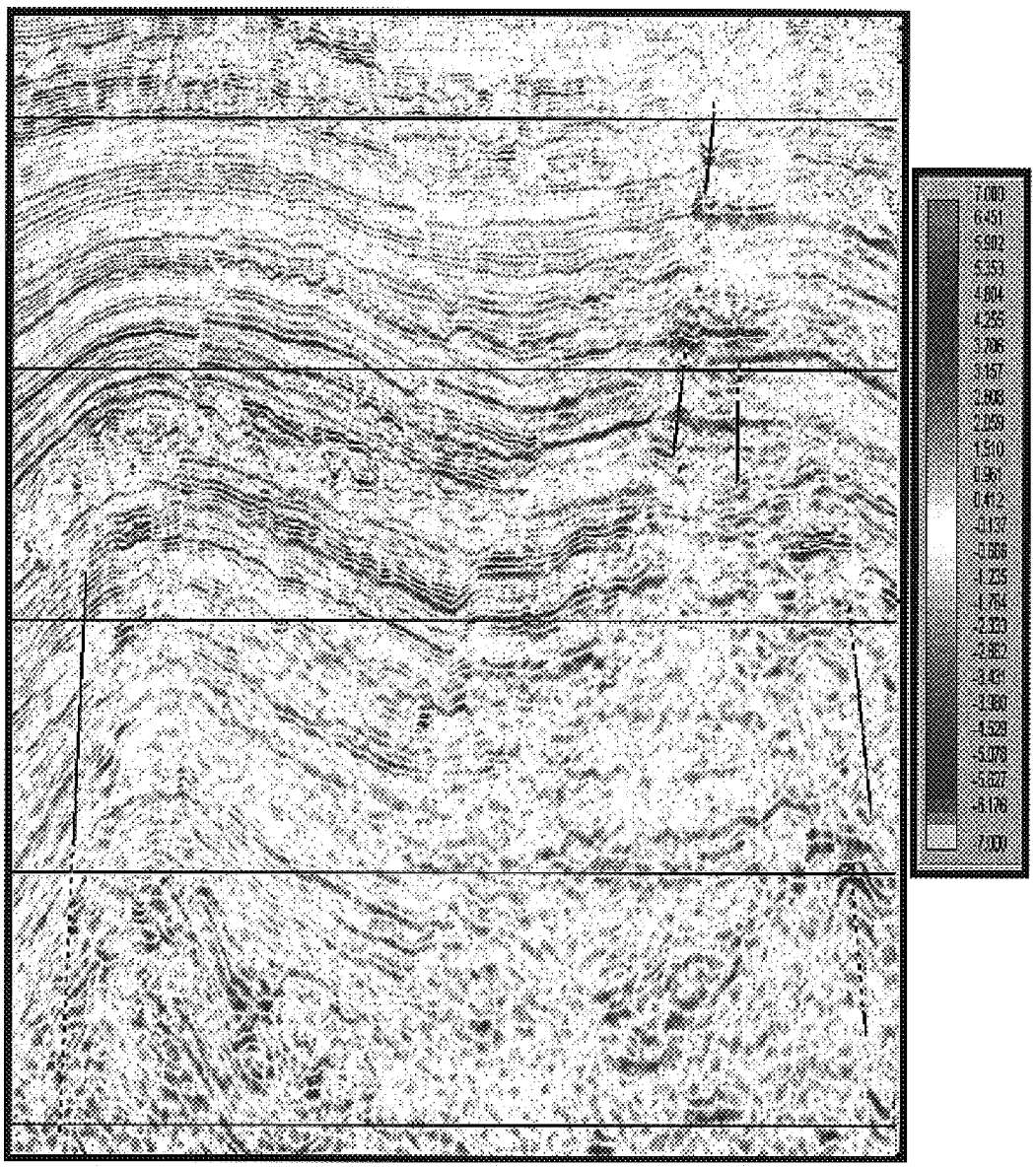
FIG. 9 shows another P—P amplitude section.
Figure 10:
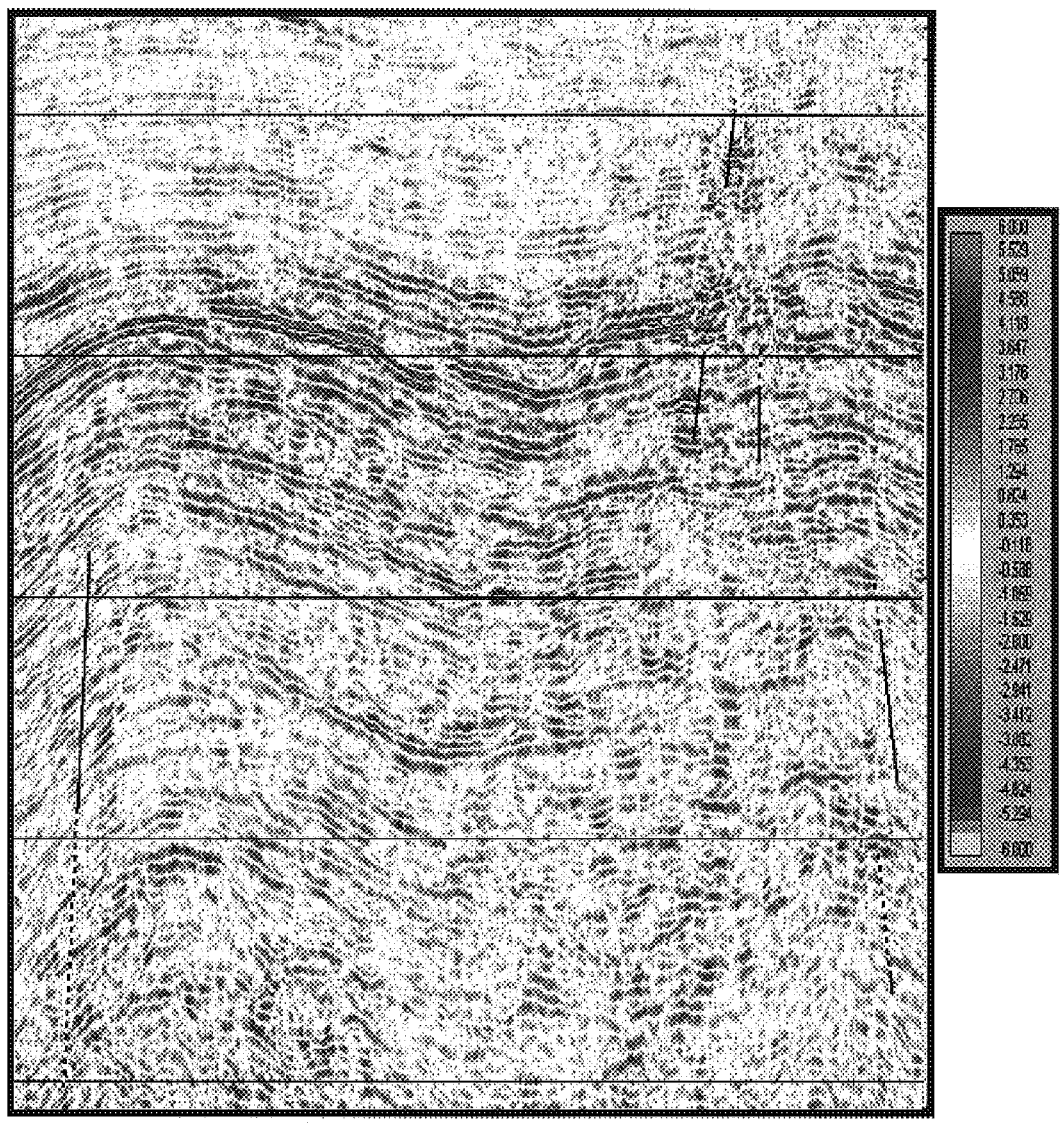
FIG. 10 shows a P-S Zs contrast section calculated from P—P AVO inversion according to another embodiment of the present disclosure.
Figure 11B:
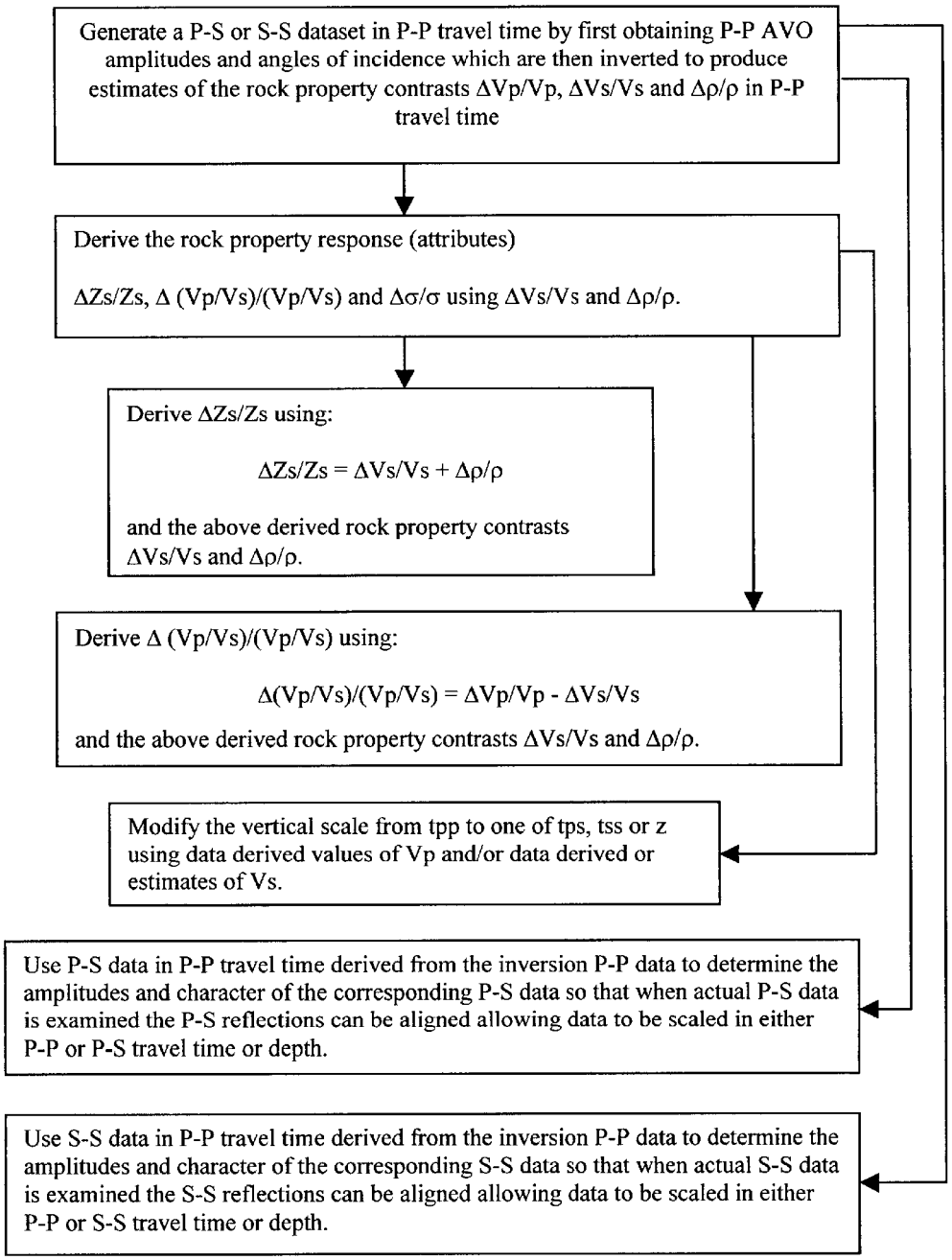
Figure 11D:
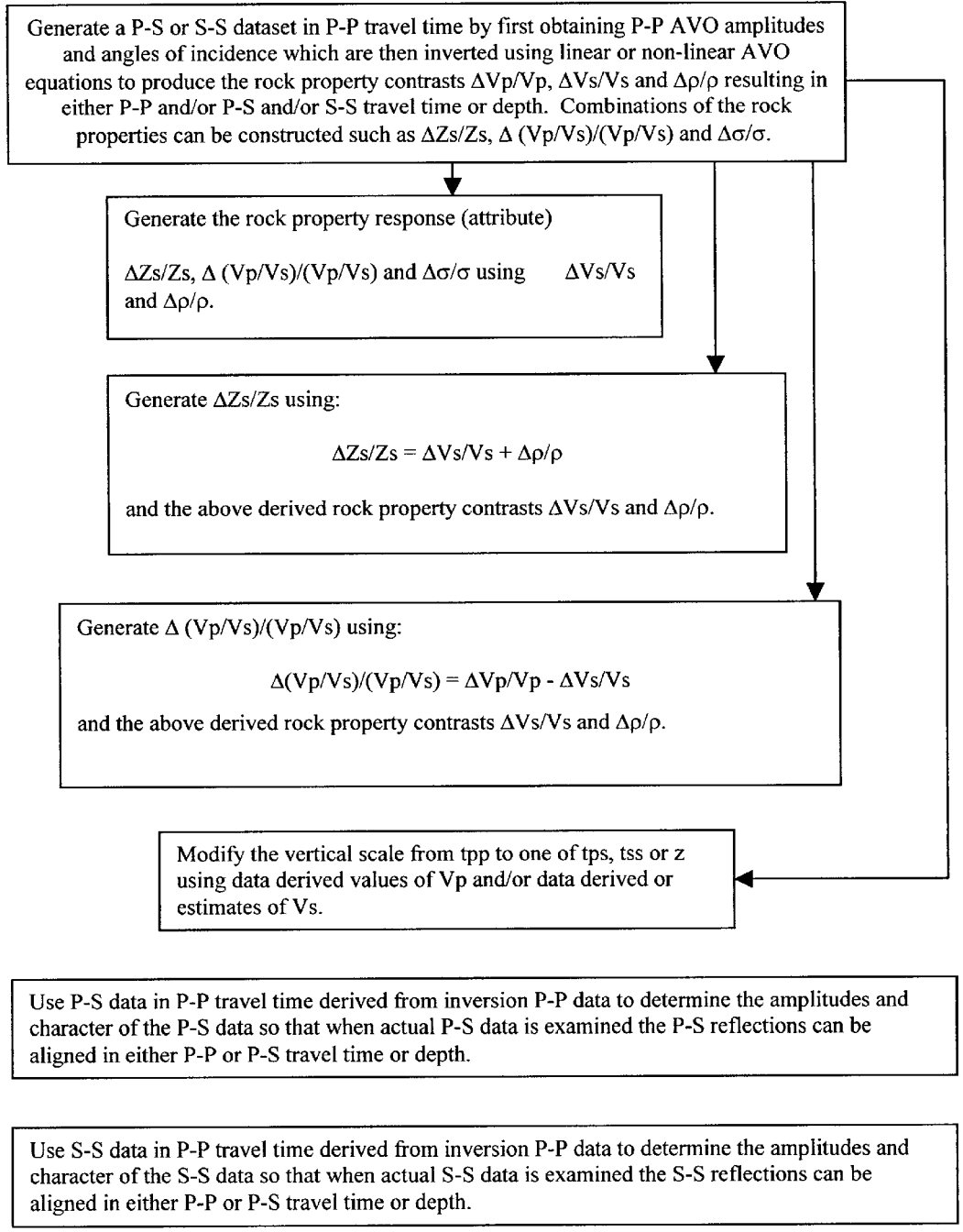

FIG. 9 shows another P—P amplitude section. More particularly, FIG. 9 shows a P—P amplitude section for an area of the Gulf of Mexico. Note the absence of strong reflectors in the upper and middle zones of FIG. 9. FIG. 10 shows a P-S Zs contrast section calculated from P—P AVO inversion according to another embodiment of the present disclosure. In particular, FIG. 10 shows Zs contrast section for the area of the Gulf of Mexico shown in FIG. 9.

Note the strong reflectors in the upper and middle zones of FIG. 10. Compare this with the traditional P—P amplitude section shown in FIG. 9. This clearly shows that if P-S data were acquired in this area and processed to produce a Zs contrast section that it would produce better results than a traditional P—P data set as shown in FIG. 9. It should also be noted that the above data set can be used as a guide to align P-S data, which had been acquired in this area and processed to produce a Zs contrast section, with the P—P data that is shown in FIG. 9. By aligning the two types of data the results can be used together to produce a superior analysis versus using only one data type. Similarly alignment of acquired S—S data or both the Zs contrast and S—S data using estimates for the same using the methods described herein may also be advantageous.

According to another embodiment, a method to generate P-S or S—S seismic data or attributes from P—P AVO data in P—P travel time, in depth, or in P-S or S—S travel time can be carried out by positioning and employing a plurality of seismic wave source-detector pairs in a geological area of interest. The plurality of seismic wave source-detector pairs are adapted to have different offsets and one common horizontal midpoint. The method continues by generating seismic waves with the sources, and detecting and recording the amplitudes of seismic waves reflected by discontinuities in isotropic parameters of the strata for each source-detector pair.

Seismic data is acquired by using a collection of sources and a collection of receivers with the data acquired in either 2-D or 3-D to be sorted into common midpoint (CMP), also known as CDP, gathers which have a common midpoint or reflection point with varying offsets for each of the traces as represented in this ensemble of traces.

Amplitude corrections are provided to the data to eliminate effects associated with spherical divergence, array effects, transmission effects, absorption effects, and other effects associated with energy propagating through and reflecting from subsurface horizons and emerging back at the surface and being received by hydrophone or geophone recording devices. These corrections can be of a deterministic or statistical or combined nature. These corrections will result in amplitudes which now are governed purely by rock property contrasts in the subsurface and by their tuning effects.

The data is velocity corrected using hyperbolic or non-hyperbolic methods, the result of which will be to produce optimally flat events. Amplitudes are extracted for each horizon in either of two ways. The first is to find the zero crossings of the trace, then find the extrema value between the zero crossings. Those extrema values will then be assigned to each sample of the data between the zero crossings. This is the lobe method.

A second method is to extract the amplitude sample-by-sample. The angle of incidence ($\theta$) is calculated by using the velocity function and the source receiver separations for each sample or lobe for each trace. The plurality of amplitude and angle of incidence pairs are inverted using linear P—P AVO equations (such as Equation 3 or its equivalent) or by using non-linear P—P AVO equations (such as Equation 4 or its equivalent). The result will be estimates of the rock property contrasts $\Delta Vp/Vp$, $\Delta Vs/Vs$ and $\Delta \rho/\rho$. The rock property contrasts are utilized as derived from the above described inversion, the P-S and S—S full stack, angle stacks, rock property contrasts combinations $\Delta Zs/Zs$, $\Delta(Vp/Vs)/(Vp/Vs)$, $\Delta\sigma/\sigma$ and any other combinations of rock properties derivable from the rock property contrasts $\Delta Vs/Vs$ and $\Delta \rho/\rho$ which are the rock properties controlling P-S and P—P data.

Data derived P wave or S wave velocities or estimates of the S wave velocities from P wave velocities can be used to modify the vertical scale to the depth Z or the travel times Tps or Tss rather than Tpp.

Although only a few exemplary embodiments of the disclosure have been described in detail above, those skilled in the art will readily appreciate that many modifications are possible in the exemplary embodiments without materially departing from the novel teachings and advantages of the embodiments. Accordingly, all such modifications are intended to be included within the scope of the embodiments as defined in the following claims. In the claims, means-plus-function clauses are intended to cover the structures described herein as performing the recited function, and not only structural or methodological equivalents but also equivalent structures or methods.

What is claimed is:

1. A method for generating at least one of P-S or S—S seismic data from P—P AVO data in P—P travel time for a geographic area, comprising:
    obtaining a plurality of amplitude and angle of incidence pairs of P—P AVO data;
    inverting the plurality of amplitude and angle of incidence pairs of P—P AVO data; and producing estimates of rock property contrasts from the inverted plurality of amplitude and angle of incidence pairs of P—P AVO data, the rock property contrasts including at least one of $\Delta Vp/Vp$, $\Delta Vs/Vs$ and $\Delta \rho/\rho$, wherein inverting the plurality of amplitude and angle of incidence pairs of P—P AVO data includes using at least one of a linear P—P AVO equation or a non-linear P—P AVO equation and wherein, for a geographic area in which a cap rock and reservoir are each isotropic and the data type to be generated comprises P-S data, the linear P—P AVO equation for describing the amplitude variation with offset and hence angle of incidence ($\theta$), due to a reflection between the cap rock and reservoir, comprises an equation given by:

$$Amp(\theta)_{PS} = D0 * \frac{\sin(\theta)*(2*\sin(\theta)^2 - g^2)}{2*g*\sqrt{g^2 - \sin(\theta)^2} - \frac{\sin(\theta)*\cos(\theta)}{g}} +$$

$$D1 * \left( \frac{2*\sin(\theta)^3}{g*\sqrt{g^2 - \sin(\theta)^2}} - \frac{2*\sin(\theta)*\cos(\theta)}{g} \right)$$

where: $D0=(\frac{1}{2})*\Delta\rho/\rho$, and $D1=(2/g)*\Delta Vs/Vs$.

2. A method for generating at least one of P-S or S—S seismic data from P—P AVO data in P—P travel time for a geographic area, comprising:
    obtaining a plurality of amplitude and angle of incidence pairs of P—P AVO data;
    inverting the plurality of amplitude and angle of incidence pairs of P—P AVO data;
    producing estimates of rock property contrasts from the inverted plurality of amplitude and angle of incidence pairs of P—P AVO data, the rock property contrasts including at least one of $\Delta Vp/Vp$, $\Delta Vs/Vs$ and $\Delta \rho/\rho$, wherein inverting the plurality of amplitude and angle of incidence pairs of P—P AVO data includes using at least one of a linear P—P AVO equation or a non-linear P—P AVO equation and, wherein, for a geographic area in which a cap rock and reservoir are each isotropic, the data type to be generated comprises S—S data, and considering a horizontal component, the non-linear P—P AVO equation for describing the amplitude variation with offset and hence angle of incidence ($\theta$), due to a reflection between the cap rock and reservoir, comprises an equation given by:

$$Amp(\theta)_{SSh} = h1 + h2*\tan(\theta)^2$$

where: $h1=-(\frac{1}{2})*\Delta Vs/Vs-(\frac{1}{2})*\Delta\rho/\rho$, and $h2=(\frac{1}{2})*\Delta Vs/Vs$.

3. A method for generating at least one of P-S or S—S seismic data from P—P AVO data in P—P travel time for a geographic area, comprising:
    obtaining a plurality of amplitude and angle of incidence pairs of P—P AVO data;
    inverting the plurality of amplitude and angle of incidence pairs of P—P AVO data;
    producing estimates of rock property contrasts from the inverted plurality of amplitude and angle of incidence pairs of P—P AVO data, the rock property contrasts including at least one of $\Delta Vp/Vp$, $\Delta Vs/Vs$ and $\Delta \rho/\rho$, wherein inverting the plurality of amplitude and angle of incidence pairs of P—P AVO data includes using at least one of a linear P—P AVO equation or a non-linear P—P AVO equation and wherein, for a geographic area in which a cap rock and reservoir are each isotropic, the data type to be generated comprises S—S, and considering a vertical component, the non-linear P—P AVO equation which describes the amplitude variation with offset and hence angle of incidence ($\theta$), due to a reflection between the cap rock and reservoir, comprises an equation given by:

$$Amp(\theta)_{SSv} = v1 + v2*\tan(\theta)^2 + v3*\sin(\theta)^2*\tan(\theta)^2$$

where: $v1=-(\frac{1}{2})*\Delta Vs/Vs-(\frac{1}{2})*\Delta\rho/\rho$, $v2=(\frac{7}{2})*\Delta Vs/Vs+(2)*\Delta\rho/\rho$, and $v3=-(2)(2\Delta Vs/Vs+\Delta\rho/\rho)$.

4. A method for generating at least one of P-S or S—S seismic data from P—P AVO data in P—P travel time for a geographic area, comprising:
   obtaining a plurality of amplitude and angle of incidence pairs of P—P AVO data;
   inverting the plurality of amplitude and angle of incidence pairs of P—P AVO data;
   producing estimates of rock property contrasts from the inverted plurality of amplitude and angle of incidence pairs of P—P AVO data, the rock property contrasts including at least one of $\Delta Vp/Vp$, $\Delta Vs/Vs$ and $\Delta \rho/\rho$, and
   responsive to the estimates of the rock property contrasts, deriving a rock property response, the rock property response including at least one of a P-S and S—S full stack, angle stacks, rock property contrasts combinations $\Delta Zs/Zs$, $\Delta(Vp/Vs)/(Vp/Vs)$, $\Delta\sigma/\sigma$ and any other combinations of rock properties derivable from the rock property contrasts $\Delta Vs/Vs$ and $\Delta\rho/\rho$, wherein deriving the rock property response from the estimates of the rock property contrasts includes using the equation given by:

$$\Delta Zs/Zs = \Delta Vs/Vs + \Delta\rho/\rho.$$

5. A method for generating at least one of P-S or S—S seismic data from P—P AVO data in P—P travel time for a geographic area, comprising:
   obtaining a plurality of amplitude and angle of incidence pairs of P—P AVO data;
   inverting the plurality of amplitude and angle of incidence pairs of P—P AVO data;
   producing estimates of rock property contrasts from the inverted plurality of amplitude and angle of incidence pairs of P—P AVO data, the rock property contrasts including at least one of $\Delta Vp/Vp$, $\Delta Vs/Vs$ and $\Delta\rho/\rho$, and
   responsive to the estimates of the rock property contrasts, deriving a rock property response, the rock property response including at least one of a P-S and S—S full stack, angle stacks, rock property contrasts combinations $\Delta Zs/Zs$, $\Delta(Vp/Vs)/(Vp/Vs)$, $\Delta\sigma/\sigma$ and any other combinations of rock properties derivable from the rock property contrasts $\Delta Vs/Vs$ and $\Delta\rho/\rho$, wherein deriving the rock property response from the estimates of the rock property contrasts includes using the equation given by:

$$\Delta(Vp/Vs)/(Vp/Vs) = \Delta Vp/Vp - \Delta Vs/Vs.$$

6. A method for generating at least one of P-S or S—S seismic data from P—P AVO data in P—P travel time for a geographic area, comprising:
   obtaining a plurality of amplitude and angle of incidence pairs of P—P AVO data;
   inverting the plurality of amplitude and angle of incidence pairs of P—P AVO data;
   producing estimates of rock property contrasts from the inverted plurality of amplitude and angle of incidence pairs of P—P AVO data, the rock property contrasts including at least one of $\Delta Vp/Vp$, $\Delta Vs/Vs$ and $\Delta\rho/\rho$, and
   aligning actual P-S data acquired in the geographic area with actual P—P data for the geographic area to produce an improved analysis, wherein aligning includes using estimated P-S data as a guide for the alignment.

7. A method for generating at least one of P-S or S—S seismic data from P—P AVO data in P—P travel time for a geographic area, comprising:
   obtaining a plurality of amplitude and angle of incidence pairs of P—P AVO data;
   inverting the plurality of amplitude and angle of incidence pairs of P—P AVO data;
   producing estimates of rock property contrasts from the inverted plurality of amplitude and angle of incidence pairs of P—P AVO data, the rock property contrasts including at least one of $\Delta Vp/Vp$, $\Delta Vs/Vs$ and $\Delta\rho/\rho$, and
   aligning actual S—S data acquired in the geographic area with actual P—P data for the geographic area to produce an improved analysis, wherein aligning includes using estimated S—S data as a guide for the alignment.

8. A method for generating at least one of P-S or S—S seismic data from P—P AVO data in P—P travel time for a geographic area, comprising:
   obtaining a plurality of amplitude and angle of incidence pairs of P—P AVO data;
   inverting the plurality of amplitude and angle of incidence pairs of P—P AVO data using at least one of a linear P—P AVO equation and a non-linear P—P AVO equation;
   producing estimates of the rock property contrasts from the inverted plurality of amplitude and angle of incidence pairs of P—P AVO data, the rock property contrasts including at least one of $\Delta Vp/Vp$, $\Delta Vs/Vs$ and $\Delta\rho/\rho$, wherein generating at least one of P-S or S—S seismic data further includes generating the data in at least one of P—P travel time, depth, P-S travel time, and S—S travel time, and
   responsive to the estimates of the rock property contrasts, deriving a rock property response, the rock property response including at least one of a P-S and S—S full stack, angle stacks, rock property contrasts combinations $\Delta Zs/Zs$, $\Delta(Vp/Vs)/(Vp/Vs)$, $\Delta\sigma/\sigma$ and any other combinations of rock properties derivable from the rock property contrasts $\Delta Vs/Vs$ and $\Delta\rho/\rho$, wherein, for a geographic area in which a cap rock and reservoir are each isotropic and the data type is P-S, the linear P—P AVO equation for describing the amplitude variation with offset and hence angle of incidence ($\theta$), due to a reflection between the cap rock and reservoir, is given by:

$$Amp(\theta)_{PS} = D0 * \frac{\sin(\theta)*(2*\sin(\theta)^2 - g^2)}{2*g*\sqrt{g^2 - \sin(\theta)^2}} - \frac{\sin(\theta)*\cos(\theta)}{g} + D1*\left(\frac{2*\sin(\theta)^3}{g*\sqrt{g^2 - \sin(\theta)^2}} - \frac{2*\sin(\theta)*\cos(\theta)}{g}\right)$$

where: $D0 = (\frac{1}{2})*\Delta\rho/\rho$, and $D1 = (2/g)*\Delta Vs/Vs$.

9. A method for generating at least one of P-S or S—S seismic data from P—P AVO data in P—P travel time for a geographic area, comprising:
   obtaining a plurality of amplitude and angle of incidence pairs of P—P AVO data;
   inverting the plurality of amplitude and angle of incidence pairs of P—P AVO data using at least one of a linear P—P AVO equation and a non-linear P—P AVO equation;

producing estimates of the rock property contrasts from the inverted plurality of amplitude and angle of incidence pairs of P—P AVO data, the rock property contrasts including at least one of $\Delta Vp/Vp$, $\Delta Vs/Vs$ and $\Delta\rho/\rho$, wherein generating at least one of P-S or S—S seismic data further includes generating the data in at least one of P—P travel time, depth, P-S travel time, and S—S travel time, and responsive to the estimates of the rock property contrasts, deriving a rock property response, the rock property response including at least one of a P-S and S—S full stack, angle stacks, rock property contrasts combinations $\Delta Zs/Zs$, $\Delta(Vp/Vs)/(Vp/Vs)$, $\Delta\sigma/\sigma$ and any other combinations of rock properties derivable from the rock property contrasts $\Delta Vs/Vs$ and $\Delta\rho/\rho$, wherein, for a geographic area in which a cap rock and reservoir are each isotropic, the data type is S—S, and considering a horizontal component, the non-linear P—P AVO equation for describing the amplitude variation with offset and hence angle of incidence ($\theta$), due to a reflection between the cap rock and reservoir, is given by:

$$Amp(\theta)_{SSh} = h1 + h2 * Tan(\theta)^2$$

where: $h1 = -(½)*\Delta Vs/Vs - (½)*\Delta\rho/\rho$, and $h2 = (½)\Delta Vs/Vs$.

10. A method for generating at least one of P-S or S—S seismic data from P—P AVO data in P—P travel time for a geographic area, comprising:

obtaining a plurality of amplitude and angle of incidence pairs of P—P AVO data;

inverting the plurality of amplitude and angle of incidence pairs of P—P AVO data using at least one of a linear P—P AVO equation and a non-linear P—P AVO equation;

producing estimates of the rock property contrasts from the inverted plurality of amplitude and angle of incidence pairs of P—P AVO data, the rock property contrasts including at least one of $\Delta Vp/Vp$, $\Delta Vs/Vs$ and $\Delta\rho/\rho$, wherein generating at least one of P-S or S—S seismic data further includes generating the data in at least one of P—P travel time, depth, P-S travel time, and S—S travel time, and responsive to the estimates of the rock property contrasts, deriving a rock property response, the rock property response including at least one of a P-S and S—S full stack, angle stacks, rock property contrasts combinations $\Delta Zs/Zs$, $\Delta(Vp/Vs)/(Vp/Vs)$, $\Delta\sigma/\sigma$ and any other combinations of rock properties derivable from the rock property contrasts $\Delta Vs/Vs$ and $\Delta\rho/\rho$, wherein, for a geographic area in which a cap rock and reservoir are each isotropic, the data type is S—S, and considering a vertical component, the non-linear P—P AVO equation which describes the amplitude variation with offset and hence angle of incidence ($\theta$), due to a reflection between the cap rock and reservoir, is given by:

$$Amp(\theta)_{SSv} = v1 + v2*Tan(\theta)^2 + v3*Sin(\theta)^2*Tan(\theta)^2$$

where: $v1 = -(½)*\Delta Vs/Vs - (½)*\Delta\rho/\rho$, $v2 = (7/2)*\Delta Vs/Vs + (2)*\Delta\rho/\rho$, and $v3 = -(2)(2\Delta Vs/Vs + \Delta\rho/\rho)$.

11. A method for generating at least one of P-S or S—S seismic data from P—P AVO data in P—P travel time for a geographic area, comprising:

obtaining a plurality of amplitude and angle of incidence pairs of P—P AVO data;

inverting the plurality of amplitude and angle of incidence pairs of P—P AVO data using at least one of a linear P—P AVO equation and a non-linear P—P AVO equation;

producing estimates of the rock property contrasts from the inverted plurality of amplitude and angle of incidence pairs of P—P AVO data, the rock property contrasts including at least one of $\Delta Vp/Vp$, $\Delta Vs/Vs$ and $\Delta\rho/\rho$, wherein generating at least one of P-S or S—S seismic data further includes generating the data in at least one of P—P travel time, depth, P-S travel time, and S—S travel time, and responsive to the estimates of the rock property contrasts, deriving a rock property response, the rock property response including at least one of a P-S and S—S full stack, angle stacks, rock property contrasts combinations $\Delta Zs/Zs$, $\Delta(Vp/Vs)/(Vp/Vs)$, $\Delta\sigma/\sigma$ and any other combinations of rock properties derivable from the rock property contrasts $\Delta Vs/Vs$ and $\Delta\rho/\rho$, wherein deriving the rock property response from the estimates of the rock property contrasts includes using the equation given by:

$$\Delta Zs/Zs = \Delta Vs/Vs + \Delta\rho/\rho.$$

12. A method for generating at least one of P-S or S—S seismic data from P—P AVO data in P—P travel time for a geographic area, comprising:

obtaining a plurality of amplitude and angle of incidence pairs of P—P AVO data;

inverting the plurality of amplitude and angle of incidence pairs of P—P AVO data using at least one of a linear P—P AVO equation and a non-linear P—P AVO equation;

producing estimates of the rock property contrasts from the inverted plurality of amplitude and angle of incidence pairs of P—P AVO data, the rock property contrasts including at least one of $\Delta Vp/Vp$, $\Delta Vs/Vs$ and $\Delta\rho/\rho$, wherein generating at least one of P-S or S—S seismic data further includes generating the data in at least one of P—P travel time, depth, P-S travel time, and S—S travel time, and responsive to the estimates of the rock property contrasts, deriving a rock property response, the rock property response including at least one of a P-S and S—S full stack, angle stacks, rock property contrasts combinations $\Delta Zs/Zs$, $\Delta(Vp/Vs)/(Vp/Vs)$, $\Delta\sigma/\sigma$ and any other combinations of rock properties derivable from the rock property contrasts $\Delta Vs/Vs$ and $\Delta\rho/\rho$, wherein deriving the rock property response from the estimates of the rock property contrasts includes using the equation given by:

$$\Delta(Vp/Vs)/(Vp/Vs) = \Delta Vp/Vp - \Delta Vs/Vs.$$

13. A method for generating at least one of P-S or S—S seismic data from P—P AVO data in P—P travel time for a geographic area, comprising:

obtaining a plurality of amplitude and angle of incidence pairs of P—P AVO data;

inverting the plurality of amplitude and angle of incidence pairs of P—P AVO data using at least one of a linear P—P AVO equation and a non-linear P—P AVO equation;

producing estimates of the rock property contrasts from the inverted plurality of amplitude and angle of incidence pairs of P—P AVO data, the rock property contrasts including at least one of $\Delta Vp/Vp$, $\Delta Vs/Vs$ and $\Delta\rho/\rho$, wherein generating at least one of P-S or S—S seismic data further includes generating the data in at least one of P—P travel time, depth, P-S travel time, and S—S travel time;

responsive to the estimates of the rock property contrasts, deriving a rock property response, the rock property response including at least one of a P-S and S—S full stack, angle stacks, rock property contrasts combinations $\Delta Zs/Zs$, $\Delta(Vp/Vs)/(Vp/Vs)$, $\Delta\sigma/\sigma$ and any other combinations of rock properties derivable from the rock property contrasts $\Delta Vs/Vs$ and $\Delta\rho/\rho$, and aligning actual P-S data acquired in the geographic area with actual P—P data for the geographic area to produce an improved analysis, wherein aligning includes using estimated P-S data as a guide for the alignment.

14. A method for generating at least one of P-S or S—S seismic data from P—P AVO data in P—P travel time for a geographic area, comprising:

obtaining a plurality of amplitude and angle of incidence pairs of P—P AVO data;

inverting the plurality of amplitude and angle of incidence pairs of P—P AVO data using at least one of a linear P—P AVO equation and a non-linear P—P AVO equation;

producing estimates of the rock property contrasts from the inverted plurality of amplitude and angle of incidence pairs of P—P AVO data, the rock property contrasts including at least one of $\Delta Vp/Vp$, $\Delta Vs/Vs$ and $\Delta\rho/\rho$, wherein generating at least one of P-S or S—S seismic data further includes generating the data in at least one of P—P travel time, depth, P-S travel time, and S—S travel time;

responsive to the estimates of the rock property contrasts, deriving a rock property response, the rock property response including at least one of a P-S and S—S full stack, angle stacks, rock property contrasts combinations $\Delta Zs/Zs$, $\Delta(Vp/Vs)/(Vp/Vs)$, $\Delta\sigma/\sigma$ and any other combinations of rock properties derivable from the rock property contrasts $\Delta Vs/Vs$ and $\Delta\rho/\rho$, and aligning actual S—S data acquired in the geographic area with actual P—P data for the geographic area to produce an improved analysis, wherein aligning includes using estimated S—S data as a guide for the alignment.

* * * * *